United States Patent [19]

Nicia

[11] Patent Number: 4,712,856
[45] Date of Patent: Dec. 15, 1987

[54] GEODESIC OPTICAL COMPONENT

[75] Inventor: Antonius J. A. Nicia, Eindhoven, Netherlands

[73] Assignee: U.S. Philips Corp., New York, N.Y.

[21] Appl. No.: 9,084

[22] Filed: Jan. 27, 1987

Related U.S. Application Data

[63] Continuation of Ser. No. 628,075, Jul. 5, 1984.

[30] Foreign Application Priority Data

Jul. 11, 1983 [NL] Netherlands ............... 8302461

[51] Int. Cl.$^4$ ............................................... G02B 6/10
[52] U.S. Cl. .............................. 350/96.12; 350/96.11; 350/96.18; 350/96.19
[58] Field of Search ............... 350/96.10, 96.11, 96.12, 350/96.15, 96.18, 96.19, 96.30, 96.31, 413, 320

[56] References Cited

U.S. PATENT DOCUMENTS

| | | | |
|---|---|---|---|
| 1,872,501 | 8/1932 | Rehlander | 350/413 |
| 3,133,285 | 5/1964 | Jordan et al. | 350/413 |
| 3,891,302 | 6/1975 | Dabby et al. | 350/96.31 |
| 4,294,507 | 10/1981 | Johnson | 350/96.12 X |
| 4,345,815 | 8/1982 | Righini et al. | 350/96.18 |
| 4,403,825 | 9/1983 | Tangonan et al. | 350/96.11 |
| 4,445,759 | 5/1984 | Valette | 350/96.12 |
| 4,610,502 | 9/1986 | Nicia et al. | 350/96.12 |
| 4,611,883 | 9/1986 | Myer | 350/96.12 |

OTHER PUBLICATIONS

Schulz et al., "Multimode Geodesic Branching Components", Optics Comm., vol. 44, No. 4, Jan. 1983, pp. 243–248.

Barnoski et al., "Design, Fabrication . . . Spectrum Analyser", IEEE Ultrasonics Symposium Pro. 1978, Cat. #78CH1344-ISU, 5 pages.

Chang, W. L. et al., "Geodesic Components for Guided Wave Optics.", AEU, vol. 34, No. 10, pp. 385–393 (Oct. 1980).

*Primary Examiner*—William L. Sikes
*Assistant Examiner*—Brian M. Healy
*Attorney, Agent, or Firm*—Marc D. Schechter

[57] ABSTRACT

A geodesic optical component consists of a light-guiding layer on a substrate. The substrate has a surface corrugation which determines the optical function of the component. Since the surface corrugation has a wavelike character, it is possible to obtain the desired optical function while limiting the maximum depth or height of the corrugation, so that the component can be accurately produced using inexpensive pressing or etching techniques.

10 Claims, 6 Drawing Figures

GEODESIC OPTICAL COMPONENT

This is a continuation of application Ser. No. 628,075, filed Jul. 5,1984.

BACKGROUND OF THE INVENTION

The invention relates to a geodesic optical component consisting of a light-guiding layer on a substrate. The substrate surface is curved, and the shape of the curve determines the function of the component.

A component of this type can be used in optical telecommunication systems using optical waveguide fibers. For example, the component can be used in a repeater station between two parts of an optical fiber link, or in the transmitting or receiving stations at the beginning or end of an optical fiber cable.

The geodesic component can form part of an optical system integrated on a single substrate. The system consists of a light source and a light-sensitive detector. One or more optical components with special optical functions are inserted between the source and the detector. The optical functions that can be performed by geodesic optical elements include beam deflection, beam splitting, reflection and imaging.

In an article by W. L. Chang et al entitled "Geodesic Components for Guided Wave Optics" (*Archiv fur Elektronik und Ubertragungstechnik* (AEU) vol. 34, No. 10, October 1980, pages 385–393), the geometries and operations of different geodesic components are described. The designs of the optical components described therein involve the application of relatively large height differences in the substrate, on the order of a few millimeters. It is very difficult to produce such considerable height differences with the required accuracy by pressing or by etching. In order to be able to make integrated optical components or circuits in large numbers at a reasonable price, however, a technique of this type is nevertheless desirable.

SUMMARY OF THE INVENTION

It is an object of the invention to provide a geodesic optical component which can be made with the required accuracy the mean of the inexpensive etching or pressing techniques.

Geodesic optical components according to the invention have corrugated or wavelike surfaces, and therefore contain alternately positive and negative slopes.

The invention is based on the insight that, since a depression in the substrate surface has the same effect optically as a protrusion above that surface, the maximum depth can be reduced by corrugating the substrate surface.

In a preferred embodiment of a geodesic optical component according to the invention, the transitions between the positive and the negative slopes are rounded. The corrugation is produced from a curve which, at the locations of the transitions, has parts that are parallel to the flat part of the substrate.

It should be noted that it is stated in the Chang et al article that the transition from the depressed part to the flat part of the substrate must be gradual. In the component described in that article, however, the profile curve is monotonic in shape and only one transition needs to have a flowing curvature. Moreover, this profile curve was not produced from a curve with flat parts.

DESCRIPTION OF THE PREFERRED EMBODIMENTS

Figure 1:
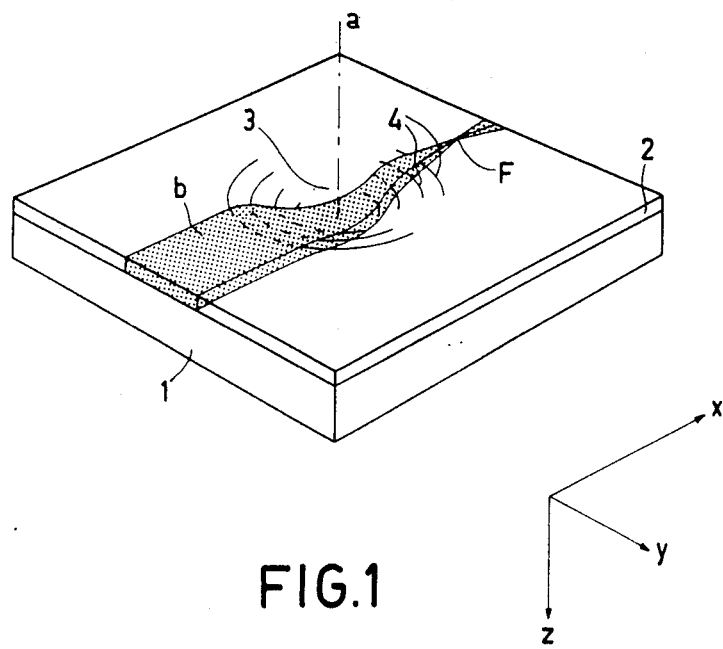
FIG. 1 is a perspective view of a know geodesic optical component.
Figure 2:
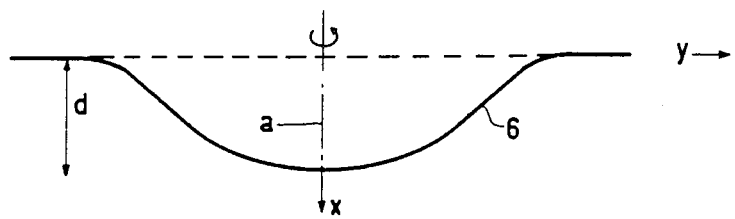
FIG. 2 schematically shows a profile of the known component.

The geodesic lens illustrated in FIG. 1 consists of a substrate 1. Substrate 1 is, for example glass, a transparent plastic, a semiconducting material, or a crystal such as lithium niobate. The substrate 1 has an unevenness, in this example a rotationally symmetric depression 3. Depression 3 is deposited by a number of concentric circles 4. FIG. 2 is a plot of a curve 6 which represents the profile of depression 3 in a plane that contains the axis of rotation a.

Applied to the substrate 1 is a thin light-guiding layer 2. For multimode light transmission, layer 2 has a thickness between about 30 μm and 75 μm. For monomode light transmission, the thickness of layer 2 is about 1 μm.

Layer 2 consists of a transparent material whose refractive index is higher than that of a substrate 1. The light-guiding layer 2 has uniform thickness and therefore follows the shape of the substrate. Since the refractive index of the layer 2 is greater than the refractive indexes surrounding it, most of the radiant energy of a beam b entering layer 2 from the left will remain trapped inside the light-conducting layer 2. Since at the location of the depression 3 in the substrate 1 the shape of the layer 2 also changes, the directions of the peripheral rays of the beam b also change. The beam b then converges and is focused at the point F.

The power of the geodesic lens is determined by the depth d of the depression 3. If d has a small value, the lens is weak. If d is larger, the lens focuses more strongly. In order to obtain the focussing power required in practical cases, the depth d could well be a few millimeters.

In order to manufacture geodesic optical elements or, more generally, geodesic optical circuits in large numbers at acceptable costs, it is desirable to produce the surface variations by pressing or etching.

Figure 3:
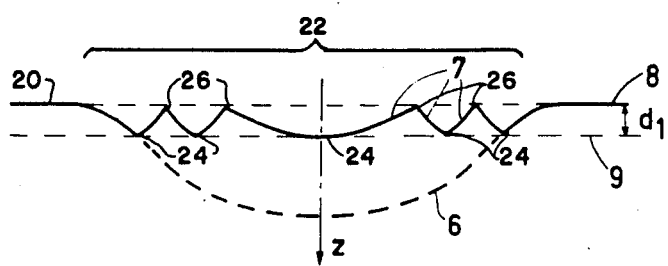
FIG. 3 schematically shows a profile of a geodesic optical component according to the invention.

Thus, a geodesic optical waveguide according to the present invention comprises a substrate having a plane surface portion 20, and a curved surface portion 22. (FIG. 3.) The curved surface portion 22 is made up of a plurality of points located at heights relative to the plane surface portion 20. The curved surface portion has points 24 of local minimum height, and points 26 of local maximum height. Neither the points 24 of local minimum height nor the points 26 of local maximum height are arranged on the boundary of the curved surface portion 22. At least one point 26 of local maximum height is arranged between points 24 of local minimum height. Alternatively, at least one point of 24 of local minimum height is arranged between points 26 of local maximum height.

If the surface variations are relatively deep, it is very difficult to produce them with the desired accuracy, on the order of 3 μm, by pressing or etching.

According to the invention, the relatively deep depression which is required to satisfy specific optical function, is replaced with a relatively shallow depression so that inexpensive etching or pressing techniques can be used. The depression is no longer monotonic but is wavelike in form. That is the curve representing a cross-section through the depression is composed of a number of parts with alternately positive and negative slopes.

FIG. 3 shows such a profile curve 7 of a geodesic lens according to the invention. This lens has the same optical properties as the lens in FIG. 1. For comparison the profile curve of the latter lens is indicated by a dashed line 6 in FIG. 3.

The curve 7 is produced by first following from the substrate surface 8 the original curve 6 until a particular depth $d_1$ is reached. The second segment of the curve 7 is a mirror image of the second segment of curve 6 with respect to the line 9. The length of the second segment of curve 7 is preferably chosen such that it extends to the original plane of the substrate surface 8.

The design of the profile represented by curve 7 relies on recognition of the fact that a depression has the same optical effect as a protrusion. Evidently, an observer situated above the substrate in FIG. 1 will observe a depression. An observer situated under the substrate will observe a protrusion or a hill.

The profile curve 7 shown in FIG. 3 has sharp transitions between the positive and the negative slopes. These sharp transitions can cause light scattering. To avoid such scattering, the transitions should be rounded off, as in the transition from the sunken to the flat part of the substrate as shown in FIG. 2. These rounded regions are incidental in the sense that they are not connected with the lens function. Therefore, the rounded regions must be as small as possible in order to ensure that they do not unduly influence the operation of the lens.

Figure 4:
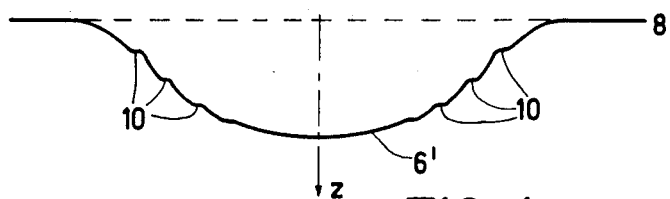
FIG. 4 schematically shows a profile with flat parts of an optical component according to the invention.

According to the invention, the rounded regions can be spread over larger areas to achieve better scatter-suppression. This can be achieved by taking the rounded regions into account in the design of the lens. For a given function, a monotonic profile curve is first calculated having horizontal regions which flow smoothly into the other parts of the curve. FIG. 4 shows such a monotonic profile curve 6' with horizontal regions 10.

Figure 5:
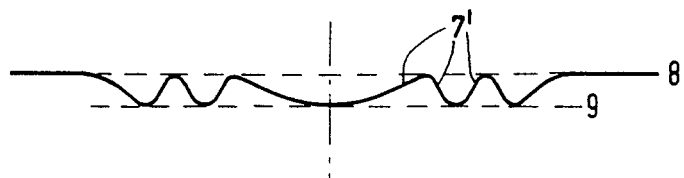
FIG. 5 schematically shows a geodesic optical component with rounded transitions, derived from the profile curve in FIG. 4.

Next, the profile curve 6' is converted into a zigzag curve 7' in the same manner as curve 6 in FIG. 2 is converted into the curve 7 in FIG. 3. Curve 7' shown in FIG. 5 has substantial rounded areas, but the lens operation is nevertheless the same as that of the curve in FIG. 2.

The geodesic optical components according to the invention can be made by the known method of first producing the required profile in a substrate and then applying the light-guiding layer by vapor deposition or diffusion. The profiled substrate can be made either by known etching or pressing techniques or by a so-called replication process. An accurate profile can be made because the profiles are so shallow. Fore example, a geodesic optical component can be made by pressing a matrix into a softened material. A process of this type is illustrated in FIG. 6.

Figure 6:
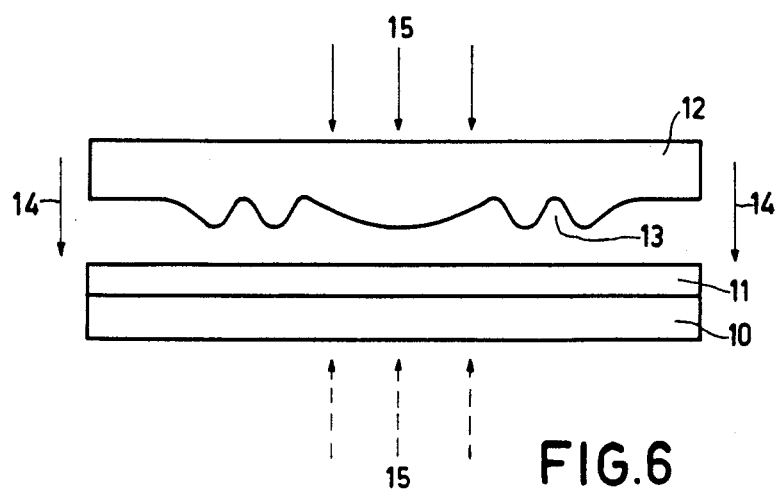
FIG. 6 schematically shows a method of fabricating a profiled substrate for a geodesic optical component.

In FIG. 6, a plate 10 is coated with a sufficiently thick layer 11 of a sufficiently softened plastic. The plastic is capable of being cured (hardened) by heat, by ultraviolet radiation or by cooling. Photopolymerizable lacquers curable by ultraviolet light are particularly suitable for this purpose.

Next, a matrix 12 is provided. Matrix 12 has a profile 13 which is a negative of the profile to be produced. For example, matrix 12 is negative of the lens profile in FIG. 3 or FIG. 5. This matrix is then, as shown by the arrows 14, pressed into the plastic layer. The plastic is then hardened, for example by irradiating it with ultraviolet light 15 through the plate 10 or through the matrix 12. After the plastic layer 11 is hardened, the matrix 12 is removed.

The invention has been described with respect to a geodesic lens. It will be evident that the invention can be applied to other geodesic components, for example beam splitters, beam deflectors and reflectors, as described in the article by Change et al.

What is claimed is:

1. A geodesic optical waveguide comprising:
   a substrate having a plane surface portion and a curved surface portion bounded by the plane surface portion; and
   an optical waveguide layer on the surface of the substrate, said waveguide layer having a substantially uniform thickness and following the shape of the substrate;
   characterized in that:
   the curved surface portion is made up of a plurality of points, each point being located at a height relative to the plane surface portion of the substrate;
   the curved surface portion has at least two points of local minimum height, not arranged on the boundary of the curved surface portion; and
   the curved surface portion has at least one point of local maximum height arranged between the points of local minimum height.

2. A geodesic optical waveguide as claimed in claim 1, characterized in that the curved surface portion has a plurality of points of local maximum height, all of said points of local maximum height being arranged substantially in the plane of the plane surface portion.

3. A geodesic optical waveguide as claimed in claim 1, characterized in that:
   the curved surface portion has a first set of points of local minimum height forming a first line;
   the curved surface portion has a second set of points of local minimum height forming a second line; and
   the curved surface portion has a third set of points of local maximum height forming a third line which is arranged between the first and second lines.

4. A geodesic optical waveguide as claimed in claim 1, characterized in that the slope of the curved surface portion is continuous at all points of local minimum height and at all points of local maximum height.

5. A geodesic optical waveguide as claimed in claim 1, characterized in that:
   the curved surface portion has a first set of points of local maximum height forming a first line;
   the curved surface portion has a second set of points of local maximum height forming a second line; and
   the curved surface portion has a third set of points of local minimum height forming a third line which is arranged between the first and second lines.

6. A geodesic optical waveguide comprising:

a substrate having a plane surface portion and a curved surface portion bounded by the plane surface portion; and an optical waveguide layer on the surface of the substrate, said waveguide layer having a substantially uniform thickness and following the shape of the substrate;

characterized in that:

the curved surface portion is made up of a plurality of points, each point being located at a height relative to the plane surface portion of the substrate;

the curved surface portion has at least two points of local maximum height, not arranged on the boundary of the curved surface portion; and the curved surface portion has at least one point of local minimum height arranged between the points of local maximum height.

7. A geodesic optical waveguide as claimed in claim 6, characterized in that the curved surface portion has a plurality of points of local maximum height, all of said points of local maximum height being arranged substantially in the plane of the plane surface portion.

8. A geodesic optical waveguide as claimed in claim 6, characterized in that:

the curved surface portion has a first set of points of local maximum height forming a first line;

the curved surface portion has a second set of points of local maximum height forming a second line; and the curved surface portion has a third set of points of local minimum height forming a third line which is arranged between the first and second lines.

9. A geodesic optical waveguide as claimed in claim 6, characterized in that the slope of the curved surface portion is continuous at all points of local minimum height and at all points of local maximum height.

10. A geodesic optical waveguide as claimed in claim 6, characterized in that:

the curved surface portion has a first set of points of local minimum height forming a first line;

the curved surface portion has a second set of points of local minimum height forming a second line; and the curved surface portion has a third set of points of local maximum height forming a third line which is arranged between the first and second lines.

* * * * *